June 13, 1933.  W. E. JOHN  1,913,488
ADJUSTING MEANS FOR CINEMATOGRAPH PROJECTORS
Filed Sept. 16, 1930
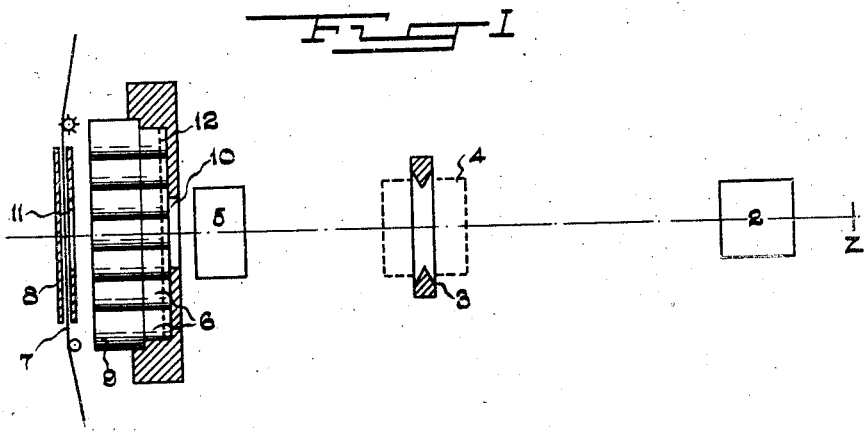
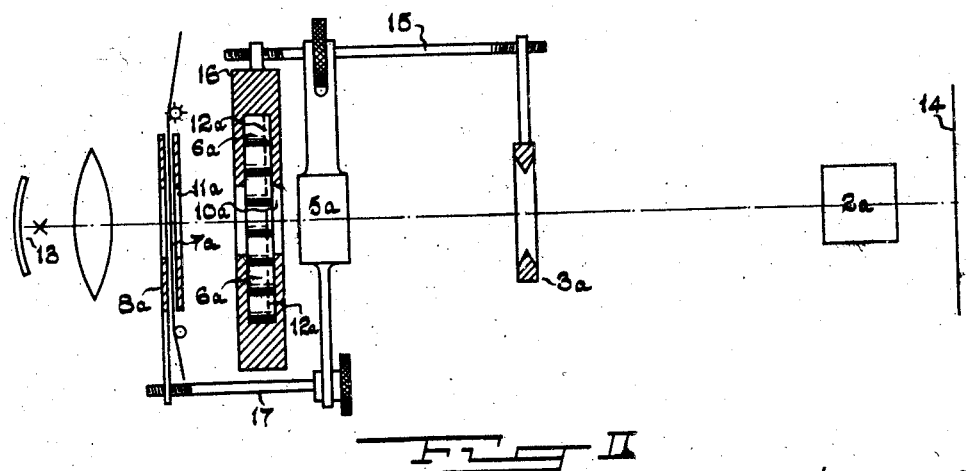
INVENTOR:
WESLEY ERNEST JOHN
BY: Ruege, Boyce & Bakelar
ATTORNEYS.

Patented June 13, 1933

1,913,488

UNITED STATES PATENT OFFICE

WESLEY ERNEST JOHN, OF MERTON PARK, LONDON, ENGLAND

ADJUSTING MEANS FOR CINEMATOGRAPH PROJECTORS

Application filed September 16, 1930, Serial No. 482,230, and in Great Britain November 4, 1929.

This invention relates to adjusting means for cinematograph projectors of the type comprising a source of light; a film holder; a series of moving lenses disposed at a fixed pitch and moving with the film, there being one lens for each film frame; a stationary composing lens, and means defining a gate so as to form at said gate a single composite image from several adjacent film frames. The conjugate foci of the system comprising the composing lens and the moving lenses are respectively in the film plane and in the gate.

This type of projector is intended to be used with films which are photographed by means of a camera employing the same optical system, that is, the film pictures are photographed by focussing an image of the object at a gate, which may define a simple opening or may include a field lens to make the best use of the available light. Behind the gate is an optical system comprising a fixed motion correcting lens and a series of lenses moving with the film. Said series may be arranged between the fixed lens and the film. Each moving lens produces on the film a corresponding photographic picture of the object, the film pictures being spaced equally with the moving lenses, which are themselves spaced at the pitch desired for the film pictures. The film thus produced, when reproduced as a positive, is subject to variation in length due to atmospheric conditions so that the film frames may be unequal to the pitch of the moving lenses. This tends to cause lack of superimposition and/or focus in the components of the projected image.

According to the present invention this lack of superimposition and/or focus is compensated for by adjusting the series of moving lenses, the composing lens and the picture gate towards and from one another in the direction of the optical axis and adjusting their combination as a whole in the same direction relatively to the film holder.

The invention is illustrated diagrammatically in the accompanying drawing, in which:

Fig. I shows the camera, and
Fig. II the projector.

Referring to Fig. I, 2 indicates a lens by means of which a plane image of the object Z is produced in the gate 3. Said gate may define a plain aperture, or a field lens 4 may be provided in it with the object of conserving the available light.

Behind the gate is a fixed lens 5 spaced from the gate at the distance of its focal length, so that the rays refracted from its back are parallel. Behind the lens 5 is a series of moving lenses 6, and behind them again is the film 7 guided in the film gate 8. The distance between the film and the moving lenses 6 is equal to the focal length of said lenses 6, so that the latter project on to the film plane a series of images of the object, one for each lens 6. The film and the lenses are moved continuously and together by, for example, the mechanism described in the specification of Patent No. 1,768,772. Where the object to be photographed is relatively close to the camera and within the focal angle of the optical system, the gate 3 and lens 2 may be omitted and masks 9 are provided to confine the rays from each lens to its proper film area. Apertures 10 and 11 are provided to expose several lenses 6 and several frame lengths of film at all times. With the gate 4 and lens 2 in use, the masks 9 may be omitted.

If reproduction in colour is desired, the film pictures are photographed in successive similar groups of monochromes, each member of the group being taken with a different colour filter. In the example shown, the colour filters 12 are mounted in the cells of the lenses 6.

A positive reproduction of the negative film thus produced is made, and is projected by means of the projector shown in Fig. II. In this case a source of light 13 is provided for illuminating the film 7ª. Several frames of the film are exposed simultaneously through the aperture 11ª and the film is moved continuously. In front of the film is provided a series of moving lenses 6ª similar to the series 6, that is, one for each film frame and moving with the film and placed at their focal distance from the film; several lenses being exposed simultaneously through the aperture 10ª. In front of the moving lenses is the fixed lens 5ᵃ which in this case acts to superimpose the several images of film pictures in the gate 3ᵃ. Said gate is open and its distance from the lens 5ᵃ is equal to the focal length of said lens. The single composite image thus formed in the gate 3ᵃ is projected onto the screen 14 by the projecting lens 2ᵃ. Should, however, the desired area of the screen and its distance from the projector be sufficiently small, the gate 3ᵃ may be omitted and the screen substituted therefor.

For colour reproduction from monochromes produced as above described, sets of colour filters 12ᵃ which may be similar to those of the camera, are provided.

In order to compensate for variation in the length of the positive film, the series of lenses 6ᵃ, the gate 3ᵃ and the composing lens 5ᵃ are adjusted towards and from one another in the direction of the optical axis and their combination as a whole is adjusted in the same direction relatively to the film gate 8ᵃ. Adjustments for this purpose are shown schematically in Fig. II. A right and left hand screw 15 is rotatably mounted on the cell of lens 5ᵃ and its screwed ends are threaded respectively into the casing 16 of the lens series 6ᵃ and into the gate structure 3ᵃ. The pitches of the screw threads are in the same ratio as the focal lengths of the lenses 6ᵃ and 5ᵃ. By this means the focussing adjustment between the lenses 6ᵃ, the lens 5ᵃ and the gate 3ᵃ is effected. Further adjustment between said parts and the film gate 8ᵃ, in order to effect superimposition of the images in the gate 3ᵃ, is effected by an adjusting screw 17.

I claim:

A cinematograph film projector, comprising a film holder, a series of moving lenses, a stationary composing lens, and a gate in front of the composing lens, means securing the moving lens series, the gate and the composing lens to one another so that they form a unit, said means being adjustable to shift the moving lens series and the gate axially relatively to the composing lens proportionately to the focal lengths respectively of the moving lens series and the composing lens and further means connecting said unit to the film support, said further means being adjustable to shift the unit axially relatively to the film support.

In testimony whereof I affix my signature.

WESLEY ERNEST JOHN.